United States Patent
Seo et al.

(10) Patent No.: US 11,726,527 B2
(45) Date of Patent: Aug. 15, 2023

(54) DISPLAY DEVICE

(71) Applicant: Samsung Display Co., LTD., Yongin-si (KR)

(72) Inventors: Dong Woo Seo, Suwon-si (KR); So Jeong La, Suwon-si (KR); Dong Jin Park, Seongnam-si (KR); Jai Ku Shin, Hwaseong-si (KR); Seok Chan Lee, Suwon-si (KR); Sung Chul Choi, Hwaseong-si (KR); Ji Hye Shin, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/484,350

(22) Filed: Sep. 24, 2021

(65) Prior Publication Data

US 2022/0187872 A1    Jun. 16, 2022

(30) Foreign Application Priority Data

Dec. 10, 2020    (KR) .......... 10-2020-0171871

(51) Int. Cl.
    *G06F 1/16*    (2006.01)
(52) U.S. Cl.
    CPC .......... *G06F 1/1643* (2013.01); *G06F 1/1616* (2013.01); *G06F 1/1681* (2013.01)
(58) Field of Classification Search
    None
    See application file for complete search history.

(56) References Cited

U.S. PATENT DOCUMENTS

| | | | |
|---|---|---|---|
| 10,423,019 | B1 | 9/2019 | Song |
| 10,586,941 | B2 | 3/2020 | Lee et al. |
| 11,073,870 | B2 | 7/2021 | Yun et al. |
| 2015/0230349 | A1* | 8/2015 | Lee ...................... H10K 77/111 361/749 |
| 2019/0245955 | A1 | 8/2019 | Lee |
| 2021/0029841 | A1* | 1/2021 | Kim ....................... G06F 1/1616 |
| 2022/0075411 | A1* | 3/2022 | Lee ......................... G06F 1/1616 |
| 2022/0075413 | A1 | 3/2022 | Park et al. |
| 2022/0129094 | A1* | 4/2022 | Tatsuno ................ G06F 1/1616 |

FOREIGN PATENT DOCUMENTS

| | | |
|---|---|---|
| CN | 110445913 | 11/2019 |
| KR | 10-2017-0084402 | 7/2017 |
| KR | 10-2018-0036857 | 4/2018 |
| KR | 10-2019-0094264 | 8/2019 |
| KR | 10-2085235 | 3/2020 |
| KR | 10-2020-0058020 | 5/2020 |
| KR | 20200067804 | 6/2020 |
| KR | 20200132150 | 11/2020 |

* cited by examiner

*Primary Examiner* — Anthony Q Edwards
*Assistant Examiner* — Rashen E Morrison
(74) *Attorney, Agent, or Firm* — H.C. Park & Associates, PLC

(57) ABSTRACT

A display device includes a display panel; a first digitizer layer disposed on the display panel; a second digitizer layer disposed on the display panel and separated from the first digitizer layer; a first plate member disposed on the first digitizer layer; and a second plate member disposed on the second digitizer layer, wherein each of the first plate member and the second plate member includes a plurality of plate portions and one or more hinge portions configured to rotatably connect the plurality of plate portions to each other.

18 Claims, 10 Drawing Sheets

DG: DG1, DG2
MP: MP1, MP2
CH: CH1, CH2
LCM2: LCM2_1, LCM2_2
LCM3: LCM3_1, LCM3_2
LCM4: LCM4_1, LCM4_2
LCM5: LCM5_1, LCM5_2
LCM6: LCM6_1, LCM6_2

DISPLAY DEVICE

CROSS REFERENCE TO RELATED APPLICATION

This application claims priority from and the benefit of Korean Patent Application No. 10-2020-0171871 filed on Dec. 10, 2020, which is hereby incorporated by reference for all purposes as if fully set forth herein.

BACKGROUND

Field

Embodiments of the invention relate generally to a display device and, more specifically to a foldable display device.

Discussion of the Background

The importance of display devices is increasing with the development of multimedia. Accordingly, various kinds of display devices such as liquid crystal display (LCD) devices and organic light-emitting diode (OLED) display devices are being used.

Recently, the proportion of mobile electronic devices having a larger display screen while providing a size smaller than or equal to that of a conventional mobile electronic device is increasing, and a foldable display device (or bendable display device) having a structure that is foldable and unfoldable so as to provide a larger screen only at the time of use, is being developed.

Some members constituting the foldable display device may be disposed to be separated from each other based on an area at which a flexible display panel is folded.

The above information disclosed in this Background section is only for understanding of the background of the inventive concepts, and, therefore, it may contain information that does not constitute prior art.

SUMMARY

Aspects of the present disclosure provide a display device having a minimum separation distance between members separated from each other based on a folding area while having a small thickness.

Additional features of the inventive concepts will be set forth in the description with follows, and in part will be apparent from the description, or may be learned by practice of the inventive concepts.

According to one or more embodiments of the invention, a display device includes a display panel; a first digitizer layer disposed on the display panel; a second digitizer layer disposed on the display panel and separated from the first digitizer layer; a first plate member disposed on the first digitizer layer; and a second plate member disposed on the second digitizer layer, wherein each of the first plate member and the second plate member includes a plurality of plate portions and one or more hinge portions configured to rotatably connect the plurality of plate portions to each other.

An embodiment of a display device includes an integral member disposed in a folding area, a first non-folding area connected to one side of the folding area, and a second non-folding area connected to the other side of the folding area; a first separable member disposed on the integral member and located in the first non-folding area; a second separable member disposed on the integral member, located in the second non-folding area, and separated from the first separable member; a first plate member disposed on the first separable member; and a second plate member disposed on the second separable member, wherein each of the first plate member and the second plate member includes a plurality of plate portions and one or more hinge portions configured to rotatably connect the plurality of plate portions to each other.

An embodiment of a display device having a folding area, a first non-folding area disposed on one side of the folding area, and a second non-folding area disposed on another side of the folding area includes a display panel disposed in the first non-folding area, the folding area, and the second non-folding area; a first digitizer layer disposed in the first non-folding area and overlapping the display panel in a thickness direction; a second digitizer layer that is disposed in the second non-folding area, overlaps the display panel in the thickness direction, and is separated from the first digitizer layer; a first plate member disposed in the first non-folding area and overlapping the first digitizer layer in the thickness direction; and a second plate member disposed in the second non-folding area and overlapping the second digitizer layer in the thickness direction, wherein each of the first plate member and the second plate member includes a plurality of plate portions and a plurality of hinge portions disposed between the plurality of plate portions.

Other details of embodiments for solving the above problems are included in the detailed description and the drawings.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate illustrative embodiments of the invention, and together with the description serve to explain the inventive concepts.

DETAILED DESCRIPTION

Figure 1:
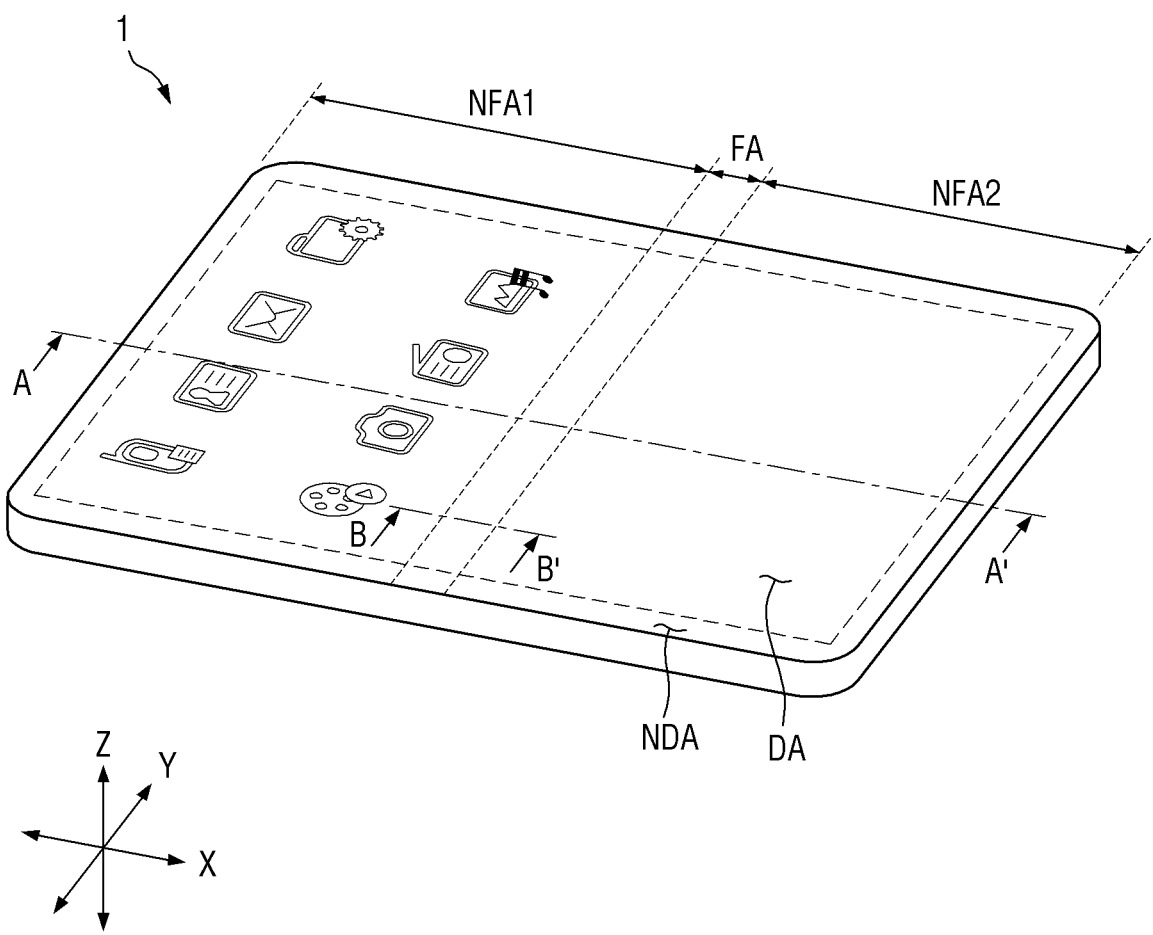
FIG. 1 is a perspective view of a display device according to an embodiment that is constructed according to principles of the invention.

In the following description, for the purposes of explanation, numerous specific details are set forth in order to provide a thorough understanding of various embodiments. It is apparent, however, that various embodiments may be practiced without these specific details or with one or more equivalent arrangements. In the accompanying figures, the size and relative sizes of layers, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various embodiments are described herein with reference to sectional illustrations that are schematic illustrations of idealized embodiments and/or intermediate structures. As such, variations from the shapes of the illustrations as a result, for example, of manufacturing techniques and/or tolerances, are to be expected. Thus, the embodiments disclosed herein should not be construed as limited to the particular illustrated shapes of regions but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, specific embodiments will be described with reference to the accompanying drawings.

Figure 2:
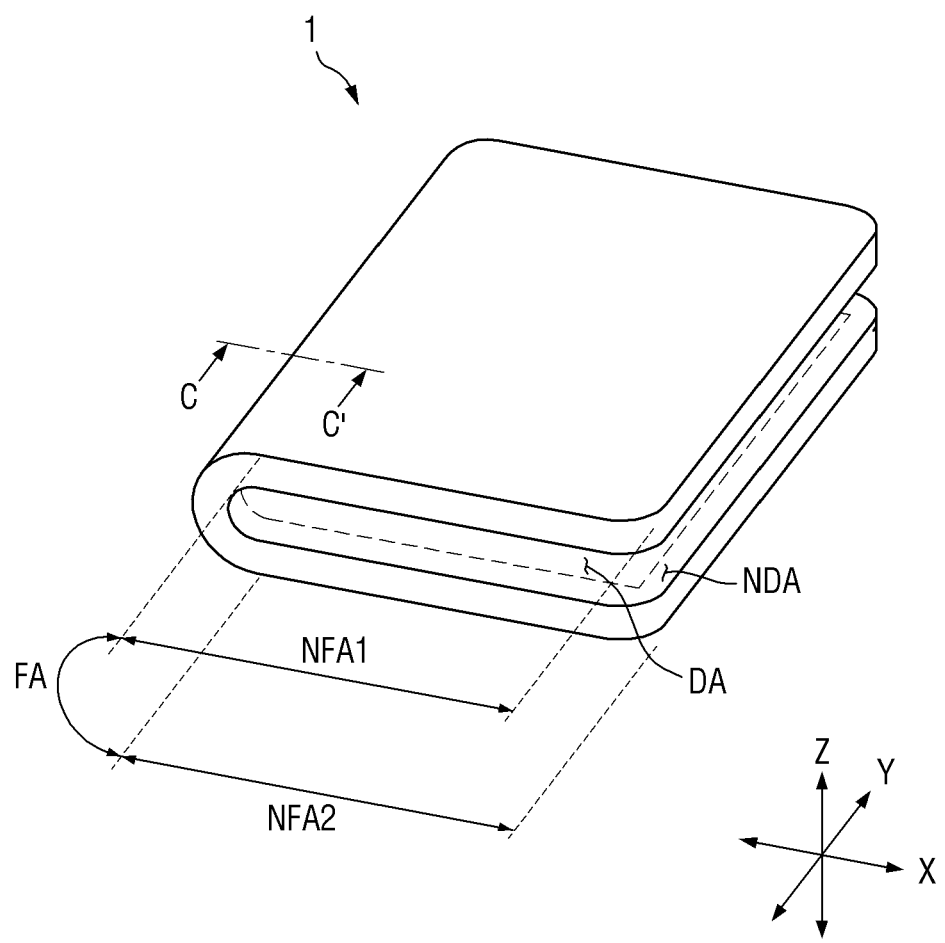
FIG. 2 is a perspective view of the display device in a folded state according to an embodiment.
Figure 3:
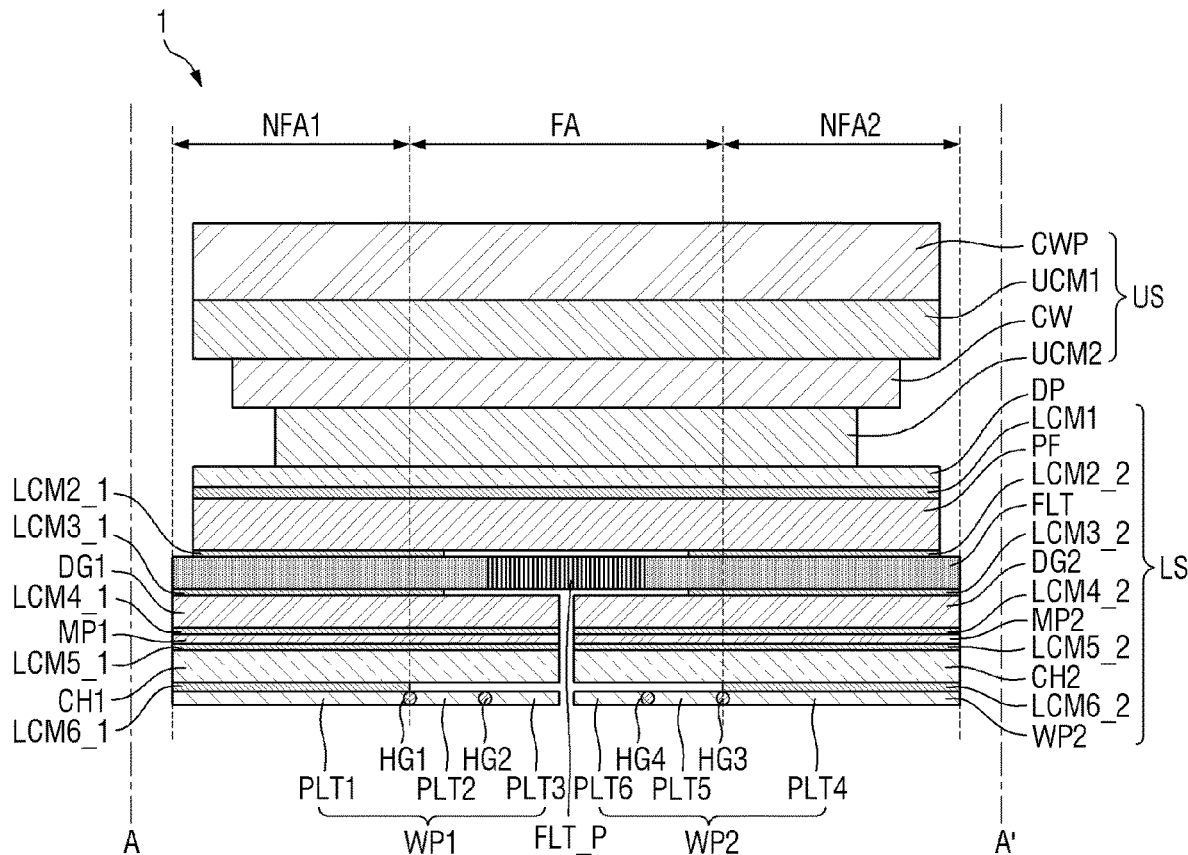
FIG. 3 is a cross-sectional view taken along line A-A' of FIG. 1.
Figure 3:
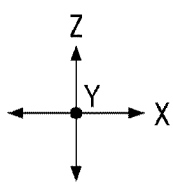
Figure 4:
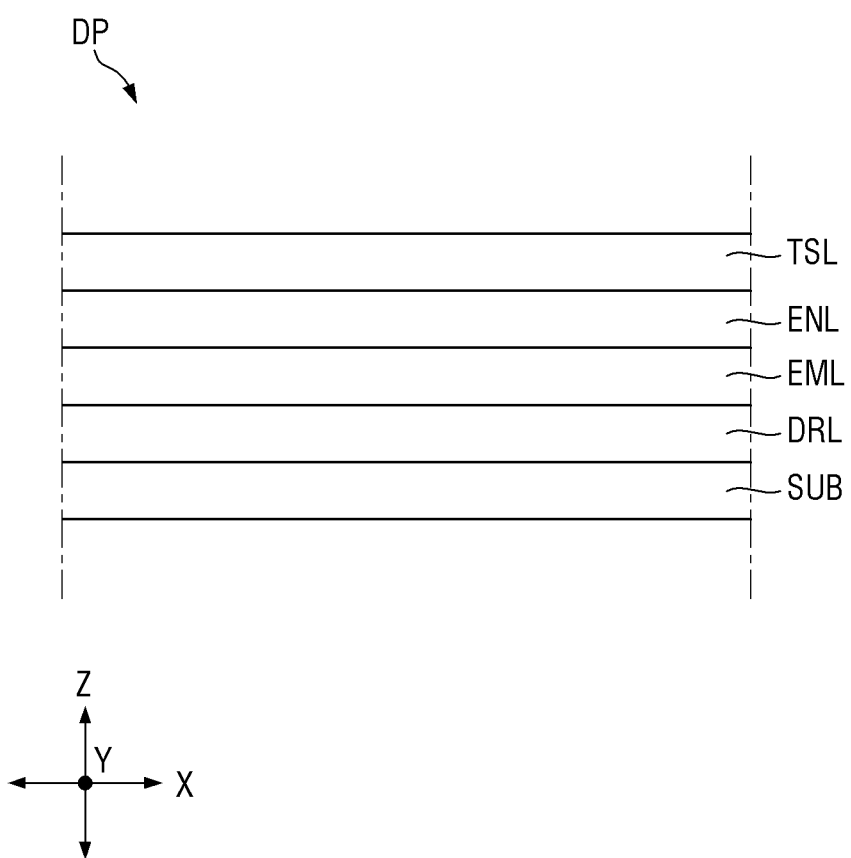
FIG. 4 is a cross-sectional view of a display panel according to an embodiment.

FIG. 1 is a perspective view of a display device according to one embodiment that is constructed according to principles of the invention. FIG. 2 is a perspective view of the display device in a folded state according to one embodiment. FIG. 3 is a cross-sectional view taken along line A-A' of FIG. 1. FIG. 4 is a cross-sectional view of a display panel according to one embodiment.

Hereinafter, a first direction X, a second direction Y, and a third direction Z cross each other in different directions. For example, the first direction X may be a length direction, the second direction Y may be a width direction, and the third direction Z may be a thickness direction. The first direction X, the second direction Y, and the third direction Z may each include two or more directions. For example, the third direction Z may include an upward direction toward an upper side of the drawing and a downward direction toward a lower side of the drawing. In this case, one surface of a member disposed to face in the upward direction may be referred to as an upper surface, and the other surface of the member disposed to face in the downward direction may be referred to as a lower surface. However, the above directions should be understood as referring to relative directions, and the embodiments described herein are not limited thereto.

A display device 1 according to an embodiment may include various devices that display videos or images. Examples of the display device 1 may include smart phones, mobile phones, tablet personal computers (PCs), personal digital assistants (PDAs), portable multimedia players (PMPs), televisions, game machines, wrist watch-type electronic devices, head-mounted displays, PC monitors, laptop computers, vehicle navigation devices, vehicle dashboards, digital cameras, camcorders, outdoor advertising boards, electronic notice boards, various medical devices, various inspection devices, various home appliances such as refrigerators and washing machines, each including a display part, Internet of Things (IoT) devices, and the like, but the embodiments described herein are not limited thereto.

Referring to FIG. 1, the display device 1 may have a rectangular shape in a plan view. In one embodiment, the display device 1 may have two long sides extending in the first direction X and two short sides in the second direction Y intersecting the first direction X in the plan view. However, the embodiment is not limited thereto, and the display device 1 may have various shapes.

The display device 1 may include a display area DA and a non-display area NDA.

The display area DA may display an image or a video. A plurality of pixels may be disposed in the display area DA. As shown in FIG. 1, the display area DA may be disposed on an upper surface of the display device 1. However, the embodiment is not limited thereto, and the display area DA may be further disposed on at least one of a lower surface and side surfaces of the display device 1.

The non-display area NDA may not display an image or a video. The non-display area NDA may be disposed around the display area DA. The non-display area NDA may surround the display area DA. The non-display area NDA may be, for example, an area in which a light-blocking member such as a black matrix is disposed. In one embodiment, the display area DA may have a rectangular shape, and the non-display area NDA may be disposed around four sides of the display area DA, but the embodiment is not limited thereto.

Referring to FIGS. 1 and 2, the display device 1 may be a foldable device that is foldable and unfoldable.

The display device 1 may be divided into a folding area FA and non-folding areas NFA1 and NFA2.

The folding area FA is an area that is folded or bent when the display device 1 is folded. The non-folding areas NFA1 and NFA2 may be areas that remain flat without being folded or bent when the display device 1 is folded.

The non-folding areas NFA1 and NFA2 may include a first non-folding area NFA1 and a second non-folding area NFA2.

The first non-folding area NFA1 and the second non-folding area NFA2 may be arranged in the first direction X, and the folding area FA may be disposed between the first non-folding area NFA1 and the second non-folding area NFA2.

The display device 1 may be folded so that the first non-folding area NFA1 overlaps the second non-folding area NFA2, bent so that the first non-folding area NFA1 is inclined with respect to the second non-folding area NFA2, or unfolded to be flat.

For example, the display device 1 may be folded so that the first non-folding area NFA1 and the second non-folding area. NFA2 form an angle greater than about 0° and less than 180°, or unfolded so that the first non-folding area NFA1 and the second non-folding area NFA2 form an angle of about 180°.

As shown in FIG. 1, when the display device 1 is unfolded, the first non-folding area NFA1, the folding area FA, and the second non-folding area NFA2 may be unfolded to be flat so as not to overlap each other in the thickness direction (i.e., the z axis as shown in FIG. 1).

As shown in FIG. 2, when the display device 1 is folded, the first non-folding area NFA1 and the second non-folding area NFA2 may overlap each other in the thickness direction (i.e., the z axis as shown in FIG. 2).

When the display device 1 is folded, the first non-folding area NFA1 and the second non-folding area NFA2 may be disposed to be inclined with respect to each other. In this case, at least a portion of the first non-folding area NFA1 and at least a portion of the second non-folding area NFA2 may overlap each other in the thickness direction or not overlap each other.

In one embodiment, one folding area FA and two non-folding areas NFA1 and NFA2 are provided, but the number and arrangement of the folding areas FA and the non-folding areas are not limited thereto. In alternative implementations, members constituting the display device 1 may also be divided into the members in the folding area FA and/or the members in the non-folding areas NFA1 and NFA2.

As shown in FIG. 2, the display device 1 may be in-folded. The term "in-folded" may denote "being folded such that at least a portion of the display area DA is not exposed to the outside when the display device 1 is folded."

For example, when the display device 1 is folded in a direction in which a portion of the display area DA faces another portion of the display area DA, and the display device 1 is completely folded, the display area DA may be surrounded by at least one another member forming an exterior of the display device 1 and may not be exposed to the outside.

The display device 1 may have an unfolded state in which the display device 1 is unfolded and a folded state in which the display device 1 is folded. The display device may be configured to be freely switchable between the unfolded state and the folded state.

As shown in FIG. 1, the unfolded state may be a state in which the first non-folding area NFA1 and the second non-folding area NFA2 are disposed to be coplanar and parallel to each other. As shown in FIG. 2, the folded state may be a state in which the first non-folding area NFA1 and the second non-folding area NFA2 are disposed to be parallel to each other and completely overlap in the thickness direction.

The folded state may further include a state in which the first non-folding area NFA1 and the second non-folding area NFA2 are about half folded. In other words, the first non-folding area NFA1 (the second non-folding area NFA2) may be disposed to be inclined with respect to the second non-folding area NFA2 (the first non-folding area NFA1). In this case, the first non-folding area NFA1 and the second non-folding area NFA2 may partially overlap each other or not overlap at all according to an angle between the first non-folding area NFA1 and the second non-folding area NFA2.

For example, the unfolded state may be a state in which the angle between the first non-folding area NFA1 and the second non-folding area NFA2 of the display device 1 is about 180°, and the folded state may be a state in which the angle between the first non-folding area NFA1 and the second non-folding area NFA2 of the display device 1 is greater than or equal to about 0° and less than about 180° and/or greater than about 180° and less than about 360°.

Referring to FIG. 3, the display device 1 may include a display panel DP, an upper stack structure US stacked on an upper surface of the display panel DP, and a lower stack structure LS stacked on a lower surface of the display panel DP.

The upper surface of the display panel DP may be a surface on which a video or an image is displayed, and the lower surface of the display panel DP may be a surface opposite to the upper surface.

The display panel DP, the upper stack structure US, and the lower stack structure LS may be disposed throughout the first non-folding area NFA1, the folding area FA, and the second non-folding area NFA2. At least one of members constituting the upper stack structure US and the lower stack structure LS may be separated based on the folding area FA. Due to the separation as described above, it is possible to reduce bending stress generated when the display device 1 is folded and/or to reduce an amount of torque required during folding.

The display panel DP is a panel on which a video or an image is displayed. Examples of the display panel DP include self-luminous display panels such as an organic light-emitting diode (OLED) display panel, an inorganic electro-luminescence (EL) display panel, a quantum dot light-emitting display (QED) panel, a micro light-emitting display (micro LED) panel, a nano LED panel, a plasma display panel (PDP), a field emission display (LED) panel, and a cathode ray tube (CRT) display panel as well as light-receiving display panels such as a liquid crystal display (LCD) panel and an electrophoretic display (EPD) panel.

The display panel DP may further include a touch member. The touch member may be provided as a panel or film separate from the display panel DP and attached onto the display panel DP but may be provided in the form of a touch layer inside the display panel DP. In the following embodiment, a case will be described in which the touch member is provided inside the display panel DP and included in the display panel DP, but the embodiment is not limited thereto.

Referring to FIG. 4, the display panel DP may include a substrate SUB, a circuit driving layer DRL disposed on the substrate SUB, a light-emitting layer EML disposed on the circuit driving layer DRL, an encapsulation layer ENL disposed on the light-emitting layer EML, and a touch layer TSL disposed on the encapsulation layer ENL.

The substrate SUB may be a flexible substrate including a flexible polymer material such as polyimide (PI). Accordingly, the display panel DP may be bendable, foldable, or rollable.

The circuit driving layer DRL may be disposed on the substrate SUB. The circuit driving layer DRL may include a circuit for driving the light-emitting layer EML of the pixel. The circuit driving layer DRL may include a plurality of thin-film transistors.

The light-emitting layer EML may be disposed on the circuit driving layer DRL. The light-emitting layer EML may include an organic light-emitting layer. The light-emitting layer EML may emit light with various levels of luminance according to a driving signal transmitted from the circuit driving layer DRL.

The encapsulation layer ENL may be disposed on the light-emitting layer EML. The encapsulation layer ENL may include an inorganic film or a stacked film of an inorganic film and an organic film.

The touch layer TSL may be disposed on the encapsulation layer ENL. The touch layer TSL may be a layer that detects a touch input and may perform a function of a touch member. The touch layer TSL may include a plurality of detection areas and a plurality of detection electrodes.

In FIG. 3, the upper stack structure US may include a cover window CW, and a cover window protection layer CWP that are sequentially stacked upward from the display panel DP.

The cover window CW may be disposed on the upper surface of the display panel DP. The cover window CW may serve to protect the display panel DP. The cover window CW may be made of a transparent material. The cover window CW may be made of, for example, glass or plastic. In one embodiment, the cover window CW may be made of glass, but the embodiment is not limited thereto.

The cover window protection layer CWP may be disposed on an upper surface of the cover window CW. The cover window protection layer CWP may be implemented as, for example, a transparent polymer film layer (PF) including at least one selected from among polyethylene terephthalate (PET), polyethylene naphthalate (PEN), polyether sulfone (PES), polyimide (PI), polyarylate (PAR) polycarbonate (PC), polymethylmethacrylate (PMMA), and a cyclo olefin polymer (COP) resin.

The upper stack structure US may further include a polarizing member disposed between the cover window CW and the display panel DP. The polarizing member may polarize light passing therethrough. The polarizing member may serve to reduce the reflection of external light. The polarizing member may be a polarizing film. The polarizing member may be replaced with an anti-reflective member including a plurality of color filters and a black matrix disposed therebetween.

The upper stack structure US may include upper coupling members UCM1 and UCM2 that couple adjacent stacked members. The upper coupling members UCM1 and UCM2 may be disposed throughout the first non-folding area NFA1, the folding area FA, and the second non-folding area NFA2.

The upper coupling members UCM1 and UCM2 may each be optically transparent. The upper coupling members UCM1 and UCM2 may each include an optically transparent adhesive, an optically transparent resin, a pressure sensitive adhesive, and the like.

In one embodiment, a first upper coupling member UCM1 may be disposed between the cover window protection layer CWP and the cover window CW to couple the cover window protection layer CWP and the cover window CW, and a second upper coupling member UCM2 may be disposed between the cover window CW and the display panel DP to couple the cover window CW and the display panel DP. The first upper coupling member UCM1 may be referred to as a cover window protective layer coupling member, and the second upper coupling member UCM2 may be referred to as a cover window coupling member.

The lower stack structure LS may include a polymer film layer PF, a planarization member FLT, a digitizer layer DG, a shielding member MP, a buffer member CH, and a plate member WP that are sequentially stacked downward from the display panel DP.

The polymer film layer PF may be disposed on the lower surface of the display panel DP. The polymer film layer PF may perform a function of supporting and protecting the display panel DP. For example, the polymer film layer PF may include polyimide (PI), polyethylene terephthalate (PET), polycarbonate (PC), polyethylene (PE), polypropylene (PP), polysulfone (PSF), polymethyl methacrylate (PMMA), triacetyl cellulose (TAC), a cyclo olefin polymer (COP), or the like.

The planarization member FLT may be disposed on a lower surface of the polymer film layer PF. The planarization member FLT may perform a function of planarizing irregularities caused by a stepped portion of electrode patterns of the digitizer layer DG, which will be described later.

The planarization member FLT may include a rigid material that does not change easily in shape or volume by pressure from the outside. For example, the planarization member FLT may include glass. As another example, the planarization member FLT may be a polymer including carbon fibers or glass fibers. When the planarization member FLT includes carbon fibers, the polymer may be epoxy, polyester, polyamide, polycarbonate, polypropylene, polybutylene, or vinyl ester. When the planarization member FLT includes glass fibers, the polymer may be epoxy, polyester, polyamide, or vinyl ester.

A thickness of the planarization member FLT may be greater than a thickness of the digitizer layer DG and/or a thickness of the shielding member MP. When the planarization member FLT includes carbon fibers, the planarization member FLT may have a Young's modulus of about 20 GPa to 30 GPa. When the planarization member FLT includes glass fibers, the planarization member FLT may have a Young's modulus of about 70 GPa to 130 GPa.

The planarization member FLT may have different rigidity in each of the folding area FA and the non-folding areas NFA1 and NFA2. In more detail, the planarization member FLT may include a pattern portion FLT_P disposed in the folding area FA to reduce the rigidity of a portion of the planarization member FLT disposed in the folding area FA. The pattern portion FLT_P may be formed in various shapes such as, for example, a lattice shape, a slit shape, a mesh shape, and a bar shape. In one embodiment, a width of the pattern portion FLT_P in the first direction X may be less than a width of the folding area FA in the first direction X. However, the embodiment is not limited thereto, and the width of the pattern portion FLT_P in the first direction X may be greater than or equal to the width of the folding area FA in the first direction X. In some implementations, the pattern portion FLT_P may be omitted.

The digitizer layer DG may include a first digitizer layer DG1 and a second digitizer layer DG2.

The first digitizer layer DG1 and the second digitizer layer DG2 may be disposed on a lower surface of the planarization member FLT to overlap at least a portion of the planarization member FLT in the thickness direction. In this case, in the unfolded state, the first digitizer layer DG1 and the second digitizer layer DG2 may overlap at least a portion of the pattern portion FLT_P in the thickness direction, but the embodiment is not limited thereto.

The first digitizer layer DG1 and the second digitizer layer DG2 may be disposed to be separated from each other based on the folding area FA. The first digitizer layer DG1 may be mainly disposed in the first non-folding area NFA1, and the second digitizer layer DG2 may be mainly disposed in the second non-folding area NFA2.

A portion of the first digitizer layer DG1 and a portion of the second digitizer layer DG2 may be disposed to be placed over the folding area FA. As shown in FIG. 3, when the display device 1 is unfolded, the portion of the first digitizer layer DG1 and the portion of the second digitizer layer DG2, which are disposed in the folding area FA, may overlap a portion of the pattern portion FLT_P of the planarization member FLT in the thickness direction.

A gap may be formed between the first digitizer layer DG1 and the second digitizer layer DG2. The gap may be formed between one end of the first digitizer layer DG1 and one end of the second digitizer layer DG2, which are disposed in the folding area FA. A width of the gap may denote a width in the first direction X when the display device 1 is unfolded.

The gap between the first digitizer layer DG1 and the second digitizer layer DG2 may overlap at least a portion of the pattern portion FLT_P. The gap between the first digitizer layer DG1 and the second digitizer layer DG2 may have a width less than that of the folding area FA and/or the pattern portion FLT_P. For example, the width of the gap between the first digitizer layer DG1 and the second digitizer layer DG2 may be less than or equal to about 1.0 mm, but the embodiment is not limited thereto.

The first digitizer layer DG1 and the second digitizer layer DG2 may each include electrode patterns for detecting an approach or contact of an electronic pen such as a stylus pen that supports an electromagnetic resonance (EMR) method. The first digitizer layer DG1 and the second digitizer layer DG2 may detect a magnetic field or electromagnetic signal emitted from the electronic pen on the basis of the electrode patterns, and may determine a point having the greatest magnetic field or electromagnetic signal among the detected magnetic fields or electromagnetic signals as a touch coordinate.

The shielding member MP may include a first shielding member MP1 and a second shielding member MP2. The first shielding member MP1 and the second shielding member MP2 may be disposed on a lower surface of the first digitizer layer DG1 and a lower surface of the second digitizer layer DG2, respectively.

The first shielding member MP1 and the second shielding member MP2 may be disposed to be separated from each other based on the folding area FA. The first shielding member MP1 may be mainly disposed in the first non-folding area NFA1, and the second shielding member MP2 may be mainly disposed in the second non-folding area NFA2.

The first shielding member MP1 and the second shielding member MP2 may overlap at least a portion of the first digitizer layer DG1 and at least a portion of the second digitizer layer DG2, respectively, in the thickness direction. In the unfolded state, the first shielding member MP1 and the second shielding member MP2 may overlap at least a portion of the pattern portion FLT_P in the thickness direction, but the embodiment is not limited thereto.

The first shielding member MP1 and the second shielding member MP2 may be disposed to have substantially the same widths as the first digitizer layer DG1 and the second digitizer layer DG2, respectively, in the first direction X. In this case, a portion of the first shielding member MP1 and a portion of the second shielding member MP2 may be disposed to be placed over the folding area FA, and a gap formed therebetween may be substantially the same as or similar to the gap formed between the first digitizer layer DG1 and the second digitizer layer DG2.

The first shielding member MP1 and the second shielding member MP2 may reduce the magnetic field or electromagnetic signal from being emitted to a lower surface of the first shielding member MP1 and a lower surface of the second shielding member MP2. In more detail, the first shielding member MP1 and the second shielding member MP2 may allow the magnetic field or electromagnetic signal passing through the digitizer layer DG to flow into the first shielding member MP1 and the second shielding member MP2. The first shielding member MP1 and the second shielding member MP2 may include a magnetic metal powder.

The buffer member CH may include a first buffer member CH1 and a second buffer member CH2. The first buffer member CH1 and the second buffer member CH2 may be disposed on the lower surface of the first shielding member MP1 and the lower surface of the second shielding member MP2, respectively. The first buffer member CH1 and the second buffer member CH2 may overlap at least a portion of the first shielding member MP1 and at least a portion of the second shielding member MP2, respectively, in the thickness direction. In the unfolded state, the first buffer member CH1 and the second buffer member CH2 may overlap at least a portion of the pattern portion FLT_P in the thickness direction, but the embodiment is not limited thereto.

The first buffer member CH1 and the second buffer member CH2 may be disposed to be separated from each other based on the folding area FA. The first buffer member CH1 may be mainly disposed in the first non-folding area NFA1, and the second buffer member CH2 may be mainly disposed in the second non-folding area NFA2.

The first buffer member CH1 and the second buffer member CH2 may be disposed to have substantially the same widths as the first digitizer layer DG1 and the second digitizer layer DG2, respectively, in the first direction X. In this case, a portion of the first buffer member CH1 and a portion of the second buffer member CH2 may be disposed to be placed over the folding area FA, and a gap formed therebetween may be substantially the same as or similar to the gap formed between the first digitizer layer DG1 and the second digitizer layer DG2.

The first buffer member CH1 and the second buffer member CH2 may absorb external impact to prevent a structure stacked thereon, for example, the first digitizer layer DG1 and the second digitizer layer DG2 from being damaged. The first buffer member CH1 and the second buffer member CH2 may include a material having elasticity, such as rubber, or a sponge obtained by foaming a urethane-based material or an acrylic-based material.

The plate member WP may include a first plate member WP1 and a second plate member WP2. The first plate member WP1 and the second plate member WP2 may be disposed on a lower surface of the first buffer member CH1 and a lower surface of the second buffer member CH2, respectively.

At least a portion of the first plate member WP1 and at least a portion of the second plate member WP2 may overlap the first buffer member CH1 and the second buffer member CH2, respectively, in the thickness direction. In the unfolded state, the first plate member WP1 and the second plate member WP2 may overlap at least a portion of the pattern portion FLT_P in the thickness direction, but the embodiment is not limited thereto.

The first plate member WP1 and the second plate member WP2 may be disposed to be separated from each other based on the folding area FA. The first plate member WP1 may be mainly disposed in the first non-folding area NFA1, and the second plate member WP2 may be mainly disposed in the second non-folding area NFA2. As shown in FIG. 3, the first plate member WP1 and the second plate member WP2 may have a shape symmetrical to each other with respect to the folding area FA, but the embodiment is not limited thereto.

The first plate member WP1 and the second plate member WP2 may be disposed to have substantially the same widths as the first digitizer layer DG1 and the second digitizer layer DG2, respectively, in the first direction X. In this case, a portion of the first plate member WP1 and a portion of the second plate member WP2 may be disposed to be placed over the folding area FA, and a gap formed therebetween may be substantially the same as the gap formed between the first digitizer layer DG1 and the second digitizer layer DG2. A gap between the first plate member WP1 and the second plate member WP2 may denote a gap formed between a third plate portion PLT3 and a sixth plate portion PLT6, which will be described below in more detail.

In some implementations, at least one of the buffer member CH and the shielding member MP may be omitted, and the plate member WP and a sixth lower coupling member LCM6, which will be described below in more detail, may be directly disposed on the lower surface of the digitizer layer DG.

The first plate member WP1 and the second plate member WP2 may include a plurality of plate portions PLT1, PLT2, PLT3, PLT4, PLT5, and PLT6, and a plurality of hinge portions HG1, HG2, HG3, and HG4 connecting the plate portions PLT1, PLT2, PLT3, PLT4, PLT5, and PLT6.

The plurality of plate portions PLT1, PLT2, PLT3, PLT4, PLT5, and PLT6 and the plurality of hinge portions HG1, HG2, HG3, and HG4 may control curvatures of the members that are disposed to be separated from each other based on the folding area FA when the display device 1 is folded. In more detail, when the display device 1 is folded, the plurality of plate portions PLT1, PLT2, PLT3, PLT4, PLT5, and PLT6 may rotate in different directions to secure the curvatures of the members integrally disposed throughout, for example, the first non-folding area NFA1, the folding area FA, and the second non-folding area NFA2 like the display panel DP, so that the overall thickness of the display device 1 may be reduced while preventing damage to the members.

The plurality of plate portions PLT1, PLT2, PLT3, PLT4, PLT5, and PLT6 may each include a rigid material that does not change easily in shape or volume by pressure from the outside. The plurality of plate portions PLT1, PLT2, PLT3, PLT4, PLT5, and PLT6 may each be made of a rigid material capable of maintaining a shape when the display device 1 is folded and unfolded. For example, the plurality of plate portions PLT1, PLT2, PLT3, PLT4, PLT5, and PLT6 may each be made of a metal. The metal may include a metal having high heat conductivity such as copper, nickel, ferrite, and silver. That is, the plurality of plate portions PLT1, PLT2, PLT3, PLT4, PLT5, and PLT6 may each additionally perform a function of a heat dissipation member.

In the following description, the number of the plurality of plate portions PLT1, PLT2, PLT3, PLT4, PLT5, and PLT6 and the number of the plurality of hinge portions HG1, HG2, HG3, and HG4 are respectively illustrated as being 6 and 4, but the number of the plurality of plate portions PLT1, PLT2, PLT3, PLT4, PLT5, and PLT6 and the number of the plurality of hinge portions HG1, HG2, HG3, and HG4 are not limited thereto.

The first plate member WP1 may include a first plate portion PLT1, a second plate portion PLT2, the third plate portion PLT3, a first hinge portion HG1, and a second hinge portion HG2.

The first plate portion PLT1, the second plate portion PLT2, and the third plate portion PLT3 may each be formed of a plate-shaped member and may be arranged in the first direction X on the lower surface of the first buffer member CH1.

The first plate portion PLT1 may be mainly disposed in the first non-folding area NFA1, and the second plate portion PLT2 and the third plate portion PLT3 may be mainly disposed in the folding area FA. However, the embodiment is not limited thereto, and the first plate portion PLT1 may be further disposed in the folding area FA, and the second plate portion PLT2 may be further disposed in the first non-folding area NFA1.

A width of the first plate portion PLT1 in the first direction X may be greater than a width of each of the second plate portion PLT2 and the third plate portion PLT3 in the first direction X. In this case, the width of the second plate portion PLT2 in the first direction X may be greater than that of the third plate portion PLT3. However, the embodiment is not limited thereto, and the width of the second plate portion PLT2 may be less than or equal to that of the third plate portion PLT3.

The first hinge portion HG1 may rotatably connect one end of the first plate portion PLT1 and one end of the second plate portion PLT2, and the second hinge portion HG2 may rotatably connect the other end of the second plate portion PLT2 and one end of the third plate portion PLT3. In some implementations, the first hinge portion HG1 and the second hinge portion HG2 may each include a mechanical hinge including a shaft, a rotor, and the like, or an elastic hinge including a member made of an elastic material that may be bent.

The first hinge portion HG1 may be disposed at a boundary between the folding area FA and the first non-folding area NFA1, and the second hinge portion HG2 may be disposed in the folding area FA. The boundary between the folding area FA and the first non-folding area NFA1 may include a portion adjacent to the boundary. However, the embodiment is not limited thereto, and the first hinge portion HG1 may be located in the first non-folding area NFA1 or the folding area FA, or the second hinge portion HG2 may be located at the boundary between the first non-folding area NFA1 and the folding area FA.

The second plate member WP2 may include a fourth plate portion PLT4, a fifth plate portion PLT5, the sixth plate portion PLT6, a third hinge portion HG3, and a fourth hinge portion HG4.

The fourth plate portion PLT4, the fifth plate portion PLT5, and the sixth plate portion PLT6 may each be formed of a plate-shaped member and may be arranged in the first direction X on the lower surface of the second buffer member CH2. The fourth plate portion PLT4 may be mainly disposed in the second non-folding area NFA2, and the fifth plate portion PLT5 and the sixth plate portion PLT6 may be mainly disposed in the folding area FA. However, the embodiment is not limited thereto, and the fourth plate portion PLT4 may be further disposed in the folding area FA, and the fifth plate portion PLT5 may be further disposed in the second non-folding area NFA2.

A width of the fourth plate portion PLT4 in the first direction X may be greater than a width of each of the fifth plate portion PLT5 and the sixth plate portion PLT6 in the first direction X. In this case, the width of the fifth plate portion PLT5 in the first direction X may be greater than that of the sixth plate portion PLT6. However, the embodiment is not limited thereto, and the width of the fifth plate portion PLT5 may be less than or equal to that of the sixth plate portion PLT6.

The third hinge portion HG3 may rotatably connect one end of the fourth plate portion PLT4 and one end of the fifth plate portion PLT5, and the fourth hinge portion HG4 may rotatably connect the other end of the fifth plate portion PLT5 and one end of the sixth plate portion PLT6. The third hinge portion HG3 and the fourth hinge portion HG4 may each include a mechanical hinge including a shaft, a rotor, and the like, or an elastic hinge including a member made of an elastic material that may be bent.

The third hinge portion HG3 may be disposed at a boundary between the folding area FA and the second non-folding area NFA2, and the fourth hinge portion HG4 may be disposed in the folding area FA. The boundary between the folding area FA and the second non-folding area NFA2 may include a portion adjacent to the boundary. However, the embodiment is not limited thereto, and the third hinge portion HG3 may be located in the second non-folding area NFA2 or the folding area FA, or the fourth hinge portion HG4 may be located at the boundary between the second non-folding area NFA2 and the folding area FA.

The lower stack structure LS may further include lower coupling members LCM1, LCM2, LCM3, LCM4, LCM5, and LCM6 that couple adjacent stacked members. Each of the lower coupling members LCM1, LCM2, LCM3, LCM4, LCM5, and LCM6 may be disposed throughout the first non-folding area NFA1, the folding area FA, and the second non-folding area NFA2, and disposed to be separated from each other based on a center of the folding area FA.

The lower coupling members LCM1, LCM2, LCM3, LCM4, LCM5, and LCM6 may each be optically transparent. The lower coupling members LCM1, LCM2, LCM3, LCM4, LCM5, and LCM6 may each include an optically transparent adhesive, an optically transparent resin, a pressure sensitive adhesive, and the like.

In one embodiment, a first lower coupling member LCM1 may be between the display panel DP and the polymer film layer PF to couple the display panel DP and the polymer film layer PF, a second lower coupling member LCM2 may be disposed between the polymer film layer PF and the planarization member FLT to couple the polymer film layer PF and the planarization member FLT, and a third lower coupling member LCM3 may be disposed between the planarization member FLT and the digitizer layer DG to couple the planarization member FLT and the digitizer layer DG. In addition, a fourth lower coupling member LCM4 may be disposed between the digitizer layer DG and the shielding member MP to couple the digitizer layer DG and the shielding member MP, a fifth lower coupling member LCM5 may be disposed between the shielding member MP and the buffer member CH to couple the shielding member MP and the buffer member CH, the sixth lower coupling member LCM6 may be disposed between the buffer member CH and the plate member WP to couple the buffer member CH and the plate member WP.

The first lower coupling member LCM1, the second lower coupling member LCM2, the third lower coupling member LCM3, the fourth lower coupling member LCM4, the fifth lower coupling member LCM5, and the sixth lower coupling member LCM6 may be referred to as a polymer film layer coupling member, a planarization member coupling member, a digitizer layer coupling member, a shielding member coupling member, a buffer member coupling member, and a plate member coupling member, respectively.

The first lower coupling member LCM1 may be disposed throughout the first non-folding area NFA1, the folding area FA, and the second non-folding area NFA.

The second lower coupling member LCM2 may include a second-first lower coupling member LCM2-1 mainly disposed in the first non-folding area NFA1 and a second-second lower coupling member LCM2-2 mainly disposed in the second non-folding area NFA2.

A portion of the second-first lower coupling member LCM2-1 and a portion of the second-second lower coupling member LCM2-2 may be disposed to be placed over the folding area FA, and a gap may be formed between the second-first lower coupling member LCM2-1 and the second-second lower coupling member LCM2-2 in the folding area FA.

A width of the gap between the second-first lower coupling member LCM2-1 and the second-second lower coupling member LCM2-2 in the first direction X may be less than that of the folding area FA, but greater than that of the pattern portion FLT_P. The width of the gap between the second-first lower coupling member LCM2-1 and the second-second lower coupling member LCM2-2 in the first direction X may be greater than the width of the gap between the first digitizer layer DG1 and the second digitizer layer DG2 in the first direction X. However, the embodiment is not limited thereto, and an end portion of each of the second-first lower coupling member LCM2-1 and the second-second lower coupling member LCM2-2 disposed toward the folding area FA may be located at the boundary of the folding area FA.

The third lower coupling member LCM3 may include a third-first lower coupling member LCM3-1 mainly disposed in the first non-folding area NFA1 and a third-second lower coupling member LCM3-2 mainly disposed in the second non-folding area NFA2.

A width of the third-first lower coupling member LCM3-1 in the first direction X and a width of the third-second lower coupling member LCM3-2 in the first direction X may be greater than or equal to the width of the second-first lower coupling member LCM2-1 in the first direction X and the width of the second-second lower coupling member LCM2-2 in the first direction X, respectively, but the embodiment is not limited thereto.

A portion of the third-first lower coupling member LCM3-1 and a portion of the third-second lower coupling member LCM3-2 may be disposed to be placed over the folding area FA, and a gap may be formed between the third-first lower coupling member LCM3-1 and the third-second lower coupling member LCM3-2 in the folding area FA.

The gap between the third-first lower coupling member LCM3-1 and the third-second lower coupling member LCM3-2 may be substantially the same as or similar to the gap between the second-first lower coupling member LCM2-1 and the second-second lower coupling member LCM2-2.

The fourth lower coupling member LCM4 may include a fourth-first lower coupling member LCM4-1 mainly disposed in the first non-folding area NFA1 and a fourth-second lower coupling member LCM4-2 mainly disposed in the second non-folding area NFA2.

A width of each of the fourth-first lower coupling member LCM4-1 and the fourth-second lower coupling member LCM4-2 in the first direction X may be greater than or equal to the width of each of the third-first lower coupling member LCM3-1 and the third-second lower coupling member LCM3-2 in the first direction X, respectively.

A portion of the fourth-first lower coupling member LCM4-1 and a portion of the fourth-second lower coupling member LCM4-2 may be disposed to be placed over the folding area FA, and a gap may be formed between the fourth-first lower coupling member LCM4-1 and the fourth-second lower coupling member LCM4-2 in the folding area FA.

A width of the gap between the fourth-first lower coupling member LCM4-1 and the fourth-second lower coupling member LCM4-2 in the first direction X may be greater than or equal to the width of the gap between the first digitizer layer DG1 and the second digitizer layer DG2 in the first direction X, but may be less than the width of the pattern portion FLT_P in the first direction X.

The fifth lower coupling member LCM5 may include a fifth-first lower coupling member LCM5-1 mainly disposed in the first non-folding area NFA1 and a fifth-second lower coupling member LCM5-2 mainly disposed in the second non-folding area NFA2.

A width of each of the fifth-first lower coupling member LCM5-1 and the fifth-second lower coupling member LCM5-2 in the first direction X may be substantially the same as or similar to the width of each of the fourth-first lower coupling member LCM4-1 and the fourth-second lower coupling member LCM4-2 in the first direction X, respectively.

A portion of the fifth-first lower coupling member LCM5-1 and a portion of the fifth-second lower coupling member LCM5-2 may be disposed to be placed over the folding area FA, and a gap may be formed between the fifth-first lower coupling member LCM5-1 and the fifth-second lower coupling member LCM5-2 in the folding area FA.

The gap between the fifth-first lower coupling member LCM5-1 and the fifth-second lower coupling member LCM5-2 may be substantially the same as or similar to the gap between the fourth-first lower coupling member LCM4-1 and the fourth-second lower coupling member LCM4-2.

The sixth lower coupling member LCM6 may include a sixth-first lower coupling member LCM6-1 mainly disposed in the first non-folding area NFA1 and a sixth-second lower coupling member LCM6-2 mainly disposed in the second non-folding area NFA2.

A width of each of the sixth-first lower coupling member LCM6-1 and the sixth-second lower coupling member LCM6-2 in the first direction X may be less than or equal to the width of each of the second-first lower coupling member LCM2-1 and the second-second lower coupling member LCM2-2 in the first direction X, respectively. Accordingly, at least a portion of the second plate portion PLT2, the third plate portion PLT3, at least a portion of the fifth plate portion PLT5, and the sixth plate portion PLT6 may not be attached to the buffer member CH.

A gap may be formed between the sixth-first lower coupling member LCM6-1 and the sixth-second lower coupling member LCM6-2. The gap between the sixth-first lower coupling member LCM6-1 and the sixth-second lower coupling member LCM6-2 may be mainly disposed in the folding area FA.

A width of the gap between the sixth-first lower coupling member LCM6-1 and the sixth-second lower coupling member LCM6-2 in the first direction X may be substantially the same as that of the folding area FA. An end portion of each of the sixth-first lower coupling member LCM6-1 and the sixth-second lower coupling member LCM6-2 disposed toward the folding area FA may be aligned with the boundary of the folding area FA. However, the embodiment is not limited thereto, and the width of the gap between the sixth-first lower coupling member LCM6-1 and the sixth-second lower coupling member LCM6-2 may be less than or greater than that of the folding area FA.

The sixth-first lower coupling member LCM6-1 may be interposed between the first plate portion PLT1 and the first buffer member CH1, and the sixth-second lower coupling member LCM6-2 may be interposed between the fourth plate portion PLT4 and the second buffer member CH2. The end portion of the sixth-first lower coupling member LCM6-1 and the end portion of the sixth-second lower coupling member LCM6-2, which are disposed toward the folding area FA, may overlap the first hinge portion HG1 and the third hinge portion HG3, respectively, in the thickness direction. However, the embodiment is not limited thereto, and the end portion of the sixth-first lower coupling member LCM6-1 and the end portion of the sixth-second lower coupling member LCM6-2 may be disposed on a space between the first hinge portion HG1 and the second hinge portion HG2 and a space between the third hinge portion HG3 and the fourth hinge portion HG4, respectively.

In some implementations, the display device 1 may further include one or more coupling members disposed to be separated from the sixth lower coupling member LCM6, and each disposed between the second plate portion PLT2 and the first buffer member CH1, between the third plate portion PLT3 and the first buffer member CH1, between the fifth plate portion PLT5 and the second buffer member CH2, and/or between the sixth plate portion PLT6 and the second buffer member CH2.

The second-first lower coupling member LCM2-1, the second-second lower coupling member LCM2-2, the third-first lower coupling member LCM3-1, the third-second lower coupling member LCM3-2, the fourth-first lower coupling member LCM4-1, the fourth-second lower coupling member LCM4-2, the fifth-first lower coupling member LCM5-1, the fifth-second lower coupling member LCM5-2, the sixth-first lower coupling member LCM6-1, and the sixth-second lower coupling member LCM6-2 may be referred to as a first planarization member coupling member, a second planarization member coupling member, a first digitizer layer coupling member, a second digitizer layer coupling member, a first shielding member coupling member, a second shielding member coupling member, a first buffer member coupling member, a second buffer member coupling member, a first plate member coupling member, and a second plate member coupling member, respectively.

Referring to FIG. 3, one or more members constituting the display device 1 may be divided into integral members disposed to be integrally connected throughout the first non-folding area NFA1, the folding area FA, and the second non-folding area NFA2 and separable members disposed to be separated based on the folding area FA.

The integral members may include, for example, the cover window protection layer CWP, the cover window CW, the display panel DP, the polymer film layer PF, the planarization member FLT, and the upper coupling members UCM1 and UCM2. The separable members may include, for example, the digitizer layer DG, the shielding member MP, the buffer member CH, the plate member WP, the second lower coupling member LCM2, the third lower coupling member LCM3, the fourth lower coupling member LCM4, the fifth lower coupling member LCM5, and the sixth lower coupling member LCM6.

Figure 5:
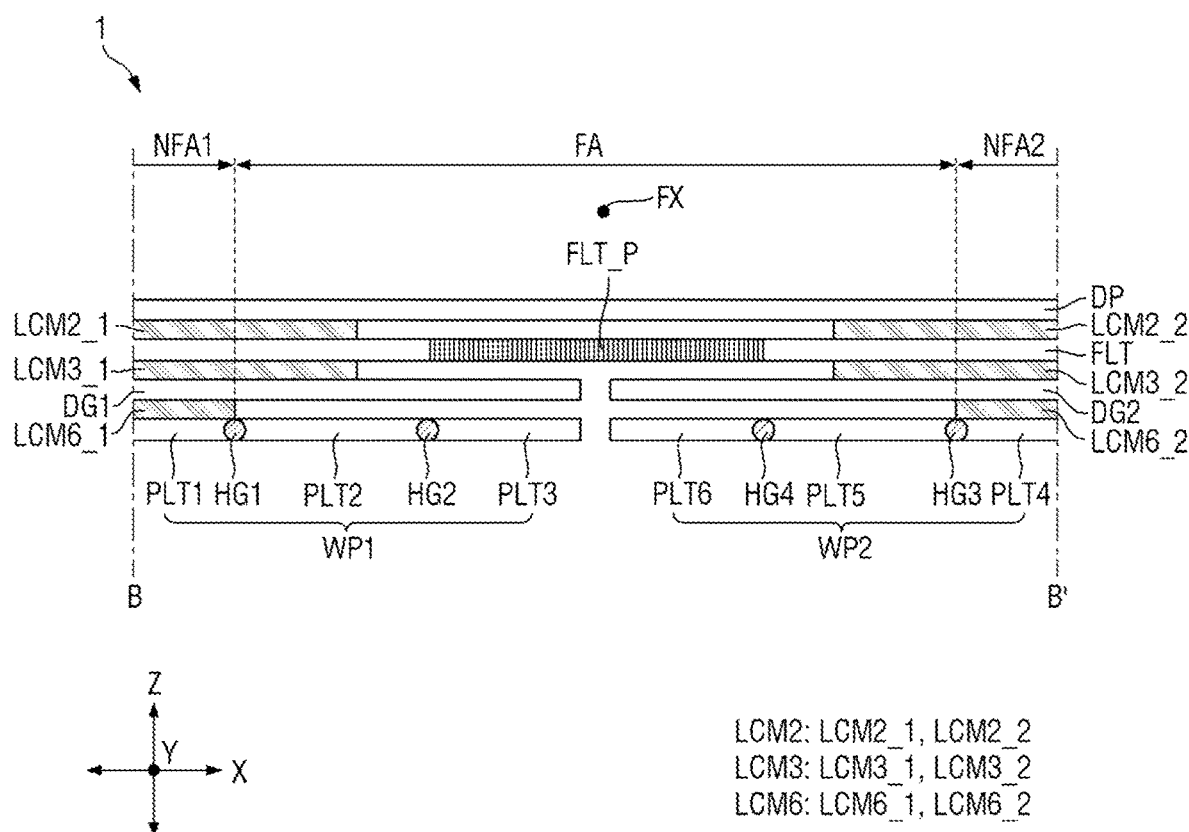
FIG. 5 is a cross-sectional view taken along line B-B' of FIG. 1.
Figure 6:
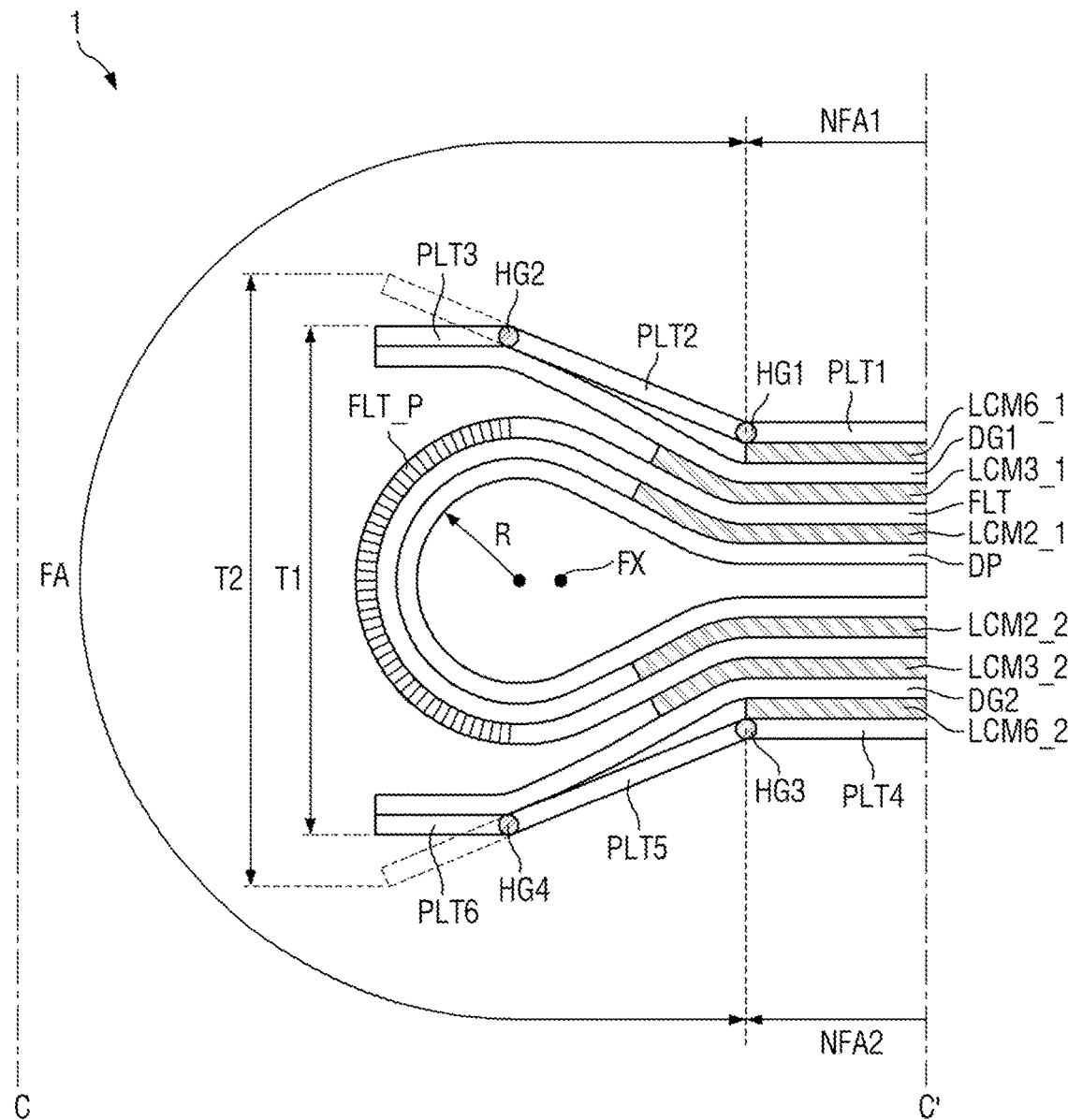
FIG. 6 is a cross-sectional view taken along line C-C' of FIG. 2.

FIG. 5 is a cross-sectional view taken along line B-B' of FIG. 1. FIG. 6 is a cross-sectional view taken along line C-C' of FIG. 2.

For convenience of description, the members other than the display panel DP, the planarization member FLT, the digitizer layer DG, the plate member WP, the second lower coupling member LCM2, the third lower coupling member LCM3, and the sixth lower coupling member LCM6 are not illustrated for ease in explanation of these figures.

Referring to FIG. 5, in the unfolded state, the display panel DP, the planarization member FLT, the digitizer layer DG, and the plate member WP may be unfolded to be a flat state. In this case, the gap may be formed between the first digitizer layer DG1 and the second digitizer layer DG2 and between the first plate member WP1 and the second plate member WP2. A width of the gap may be less than the width of each of the folding area FA and the pattern portion FLT_P. As described above, the width of the gap may be less than or equal to about 1.0 mm, but the embodiment is not limited thereto.

A distance between the first hinge portion HG1 and the third hinge portion HG3 in the first direction X may be greater than the width of the pattern portion FLT_P in the first direction X. As shown in FIG. 5, the first hinge portion HG1 and the third hinge portion HG3 may be aligned to respectively overlap the boundaries of the folding area FA in the thickness direction. In this case, the end portions of the sixth-first lower coupling member LCM6-1 and the sixth-second lower coupling member LCM6-2 may also be aligned to respectively overlap the boundaries of the folding area FA in the thickness direction. However, the embodiment is not limited thereto, and the first hinge portion HG1, the third hinge portion HG3, the sixth-first lower coupling member LCM6-1, and/or the sixth-second lower coupling member LCM6-2 may be disposed to be spaced apart from the boundaries of the folding area FA. In this case, each of the first hinge portion HG1, the third hinge portion HG3, the sixth-first lower coupling member LCM6-1, and/or the sixth-second lower coupling member LCM6-2 may be located in the non-folding areas NFA1 and NFA2, or may be located in the folding area FA.

The second hinge portion HG2 and the fourth hinge portion HG4 may be disposed between the first hinge portion HG1 and the third hinge portion HG3. A distance between the second hinge portion HG2 and the fourth hinge portion HG4 may be less than the distance between the first hinge portion HG1 and the third hinge portion HG3. The distance between the second hinge portion HG2 and the fourth hinge portion HG4 in the first direction X may be substantially the same as the width of the pattern portion FLT_P in the first direction X. The second hinge portion HG2 and the fourth hinge portion HG4 may be disposed to overlap the end portions of the pattern portion FLT_P in the thickness direction by being respectively aligned with the end portions of the pattern portion FLT_P. However, the embodiment is not limited thereto, and the distance between the second hinge portion HG2 and the fourth hinge portion HG4 may be less than or greater than the width of the pattern portion FLT_P.

A distance between the second-first lower coupling member LCM2-1 and the second-second lower coupling member LCM2-2 in the first direction X may be greater than the width of the pattern portion FLT_P in the first direction X, but may be less than the width of the folding area FA in the first direction X. The end portion of each of the second-first lower coupling member LCM2-1 and the second-second lower coupling member LCM2-2 may be disposed in the folding area FA. An end portion of each of the third-first lower coupling member LCM3-1 and the third-second lower coupling member LCM3-2 may be aligned to overlap the end portion of each of the second-first lower coupling member LCM2-1 and the second-second lower coupling member LCM2-2, respectively, in the thickness direction. However, the embodiment is not limited thereto, and the end portion of each of the second-first lower coupling member LCM2-1, the second-second lower coupling member LCM2-2, the third-first lower coupling member LCM3-1, and/or the third-second lower coupling member LCM3-2 may be disposed to overlap the boundaries of the folding area FA.

Referring to FIG. 6, in the folded state, the first plate member WP1, the first digitizer layer DG1, the second-first lower coupling member LCM2-1, the third-first lower coupling member LCM3-1, and the sixth-first lower coupling member LCM6-1 may respectively overlap the second plate member WP2, the second digitizer layer DG2, the second-second lower coupling member LCM2-2, the third-second lower coupling member LCM3-2, and the sixth-second lower coupling member LCM6-2. In the folded state, the width of the gap between the first digitizer layer DG1 and the second digitizer layer DG2 and a width of the gap between the first plate member WP1 and the second plate member WP2 may be increased compared to those in the unfolded state.

In the folded state, an outmost end of a curved portion of the display panel DP and/or an outmost end of a curved portion of the planarization member FLT may be disposed so as not to protrude further than the first plate member WP1 and the second plate member WP2. In the folded state, the second hinge portion HG2 and the fourth hinge portion HG4 may be aligned to respectively overlap one end and the other end of the pattern portion FLT_P in the thickness direction, but the embodiment is not limited thereto.

In the folded state, the first plate portion PLT1 and the fourth plate portion PLT4 may be disposed to overlap to be parallel with each other, and the second plate portion PLT2 and the fifth plate portion PLT5 may be disposed to be inclined with respect to the first plate portion PLT1 and the fourth plate portion PLT4, respectively.

In more detail, the second plate portion PLT2 may be inclined in a direction in which a distance to the fifth plate portion PLT5 increases from one end connected to the first plate portion PLT1 to the other end connected to the third plate portion PLT3, and the fifth plate portion PLT5 may be inclined in a direction in which a distance to the second plate portion PLT2 increases from one end connected to the fourth plate portion PLT4 to the other end connected to the sixth plate portion PLT6.

In the folded state, the third plate portion PLT3 and the sixth plate portion PLT6 may also be disposed to overlap in the thickness direction so as to be parallel to each other. In this case, the third plate portion PLT3 and the sixth plate portion PLT6 may be parallel to the first plate portion PLT1 and the fourth plate portion PLT4, respectively. That is, in the folded state, the first plate member WP1 and the second plate member WP2 may each have a shape that is bent twice with respect to the plurality of hinge portions HG1, HG2, HG3, and HG4 in a cross-sectional view.

In the folded state, a distance between one end (the first hinge portion HG1) of the first plate portion PLT1 and one end of the fourth plate portion PLT4 (the third hinge portion HG3) may be less than a distance between the other end of the second plate portion PLT2 (the second hinge portion HG2) and the other end of the fifth plate portion PLT5 (the fourth hinge portion HG4). The distance between the other end of the second plate portion PLT2 (the second hinge portion HG2) and the other end of the fifth plate portion PLT5 (the fourth hinge portion HG4) may be substantially the same as a distance between the other end of the third plate portion PLT3, which is opposite to one end of the third plate portion PLT3 connected to the second plate portion PLT2, and the other end of the sixth plate portion PLT6, which is opposite to one end of the sixth plate portion PLT6 connected to the fifth plate portion PLT5. The distance between the other end of the third plate portion PLT3 and the other end of the sixth plate portion PLT6 may be the width of the gap between the first plate member WP1 and the second plate member WP2.

Referring to FIGS. 5 and 6, when the unfolded state is switched to the folded state, the members located in the first non-folding area NFA1 may rotate about a folding axis FX extending in the second direction Y in a first rotation direction. When the unfolded state is switched to the folded state, the members located in the second non-folding area NFA2 may rotate about the folding axis FX in a second rotation direction.

The folding axis FX is spaced apart from a center of curvature of the display panel DP and/or the planarization member FLT and is located outside the display device 1, but the embodiment is not limited thereto. The folding axis FX may be located inside the display device 1, may overlap the center of curvature of the display device 1, and may be disposed in plural.

A portion of each of the display panel DP and the planarization member FLT located in the folding area may be bent to have a curvature. As shown in FIG. 6, when the display panel DP and the planarization member FLT located in the folding area FA are completely folded, the display panel DP and the planarization member FLT, which are located in the folding area FA, may have, for example, a dumbbell shape or a droplet shape that has a rounded end portion in a cross-sectional view. The curvature of the display panel DP and/or the planarization member FLT may have a curvature radius R of about 2.5 mm or less, but the embodiment is not limited thereto.

In the folded state, the bent portion of each of the display panel DP and the planarization member FLT may be located between the first digitizer layer DG1 and the second digitizer layer DG2. An end portion of each of the first digitizer layer DG1 and the second digitizer layer DG2, which is disposed in the folding area FA, and a portion adjacent thereto may also be bent to correspond to the curved shape of the display panel DP and the planarization member FLT. The second lower coupling member LCM2 and the third lower coupling member LCM3 that are disposed to be placed over the folding area FA may also be bent in a shape corresponding to the curvature of the display panel DP and the planarization member FLT.

In more detail, a portion of the first digitizer layer DG1 disposed on the second plate portion PLT2 and the third plate portion PLT3 in the unfolded state and a portion of the second digitizer layer DG2 disposed on the fifth plate portion PLT5 and the sixth plate portion PLT6 in the unfolded state may be bent in accordance with the shape of the display panel DP and the planarization member FLT in the folded state. For example, the portion of the first digitizer layer DG1 and the portion of the second digitizer layer DG2 may be bent so as to have an approximate S-shape, but the embodiment is not limited thereto.

When the unfolded state is switched to the folded state, the first plate member WP1 (the first plate portion PLT1) may rotate about the folding axis FX in the first rotation direction. In this case, although not shown in the drawing, the second plate member WP2 (the fourth plate portion PLT4) may rotate about the folding axis FX in the second rotation direction, which is opposite to the first rotation direction.

For example, the first rotation direction and the second rotation direction may be clockwise and counterclockwise, respectively, based on FIGS. 5 and 6.

When the unfolded state is switched to the folded state, the second plate portion PLT2 may further rotate in the first rotation direction with respect to the first hinge portion HG1, and the third plate portion PLT3 may further rotate in the second rotation direction with respect to the second hinge portion HG2. In addition, the fifth plate portion PLT5 may further rotate in the second rotation direction with respect to the third hinge portion HG3, and the sixth plate portion PLT6 may further rotate in the first rotation direction with respect to the fourth hinge portion HG4.

When the unfolded state is switched to the folded state, the second plate portion PLT2 and the fifth plate portion PLT5 may rotate so that a distance between the other side (the second hinge portion HG2) of the second plate portion PLT2, which is connected to the third plate portion PLT3, and the other side (the fourth hinge portion HG4) of the fifth plate portion PLT5, which is connected to the sixth plate portion PLT6, increases. In this case, the third plate portion PLT3 and the sixth plate portion PLT6 may rotate so that a distance between the other side of the third plate portion PLT3, which is opposite to one side of the third plate portion PLT3 connected to the second plate portion PLT2, and the other side of the sixth plate portion PLT6, which is opposite to one side of the sixth plate portion PLT6 connected to the fifth plate portion PLT5, decreases.

Due to the rotation of the third plate portion PLT3 and the sixth plate portion PLT6, the end portion of the first digitizer layer DG1 and the end portion of the second digitizer layer DG2 may be bent in one side direction in which the gap formed between the first digitizer layer DG1 and the second digitizer layer DG2 decreases. The one side direction may be, for example, a direction in which the center of curvature of the display panel DP (the planarization member FLT) is located and/or a direction in which the folding axis FX is located. Accordingly, a first thickness T1 in the case in which the display device 1 according to one embodiment is folded may be less than a second thickness T2 in the case in which the first digitizer layer DG1 and the second digitizer layer DG2 are not bent. For example, a difference between the second thickness T2 and the first thickness T1 may be about 2.0 mm, but the embodiment is not limited thereto.

When the folded state is switched to the unfolded state, the rotation of the first plate member WP1 and the second plate member WP2 may be performed in a direction opposite to the rotation direction in the case in which the unfolded state is switched to the folded state. In more detail, when the folded state is switched to the unfolded state, the first plate member WP1 and the second plate member WP2 may rotate about the folding axis FX in the second rotation direction and the first rotation direction, respectively. In this case, the second plate portion PLT2 may further rotate in the second rotation direction with respect to the first hinge portion HG1, the third plate portion PLT3 may further rotate in the second rotation direction with respect to the second hinge portion HG2, the fifth plate portion PLT5 may further rotate in the first rotation direction with respect to the third hinge portion HG3, and the sixth plate portion PLT6 may further rotate in the second rotation direction with respect to the fourth hinge portion HG4.

Figure 7:
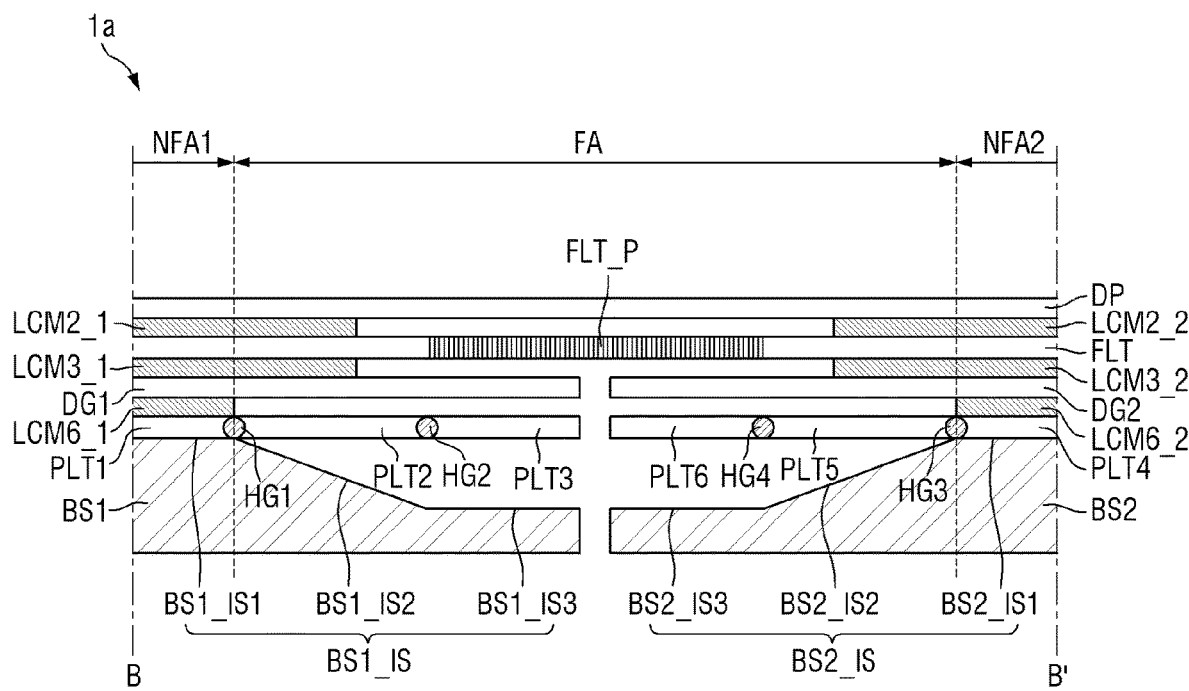
FIGS. 7 and 8 are cross-sectional views of a display device according to another embodiment.
Figure 8:
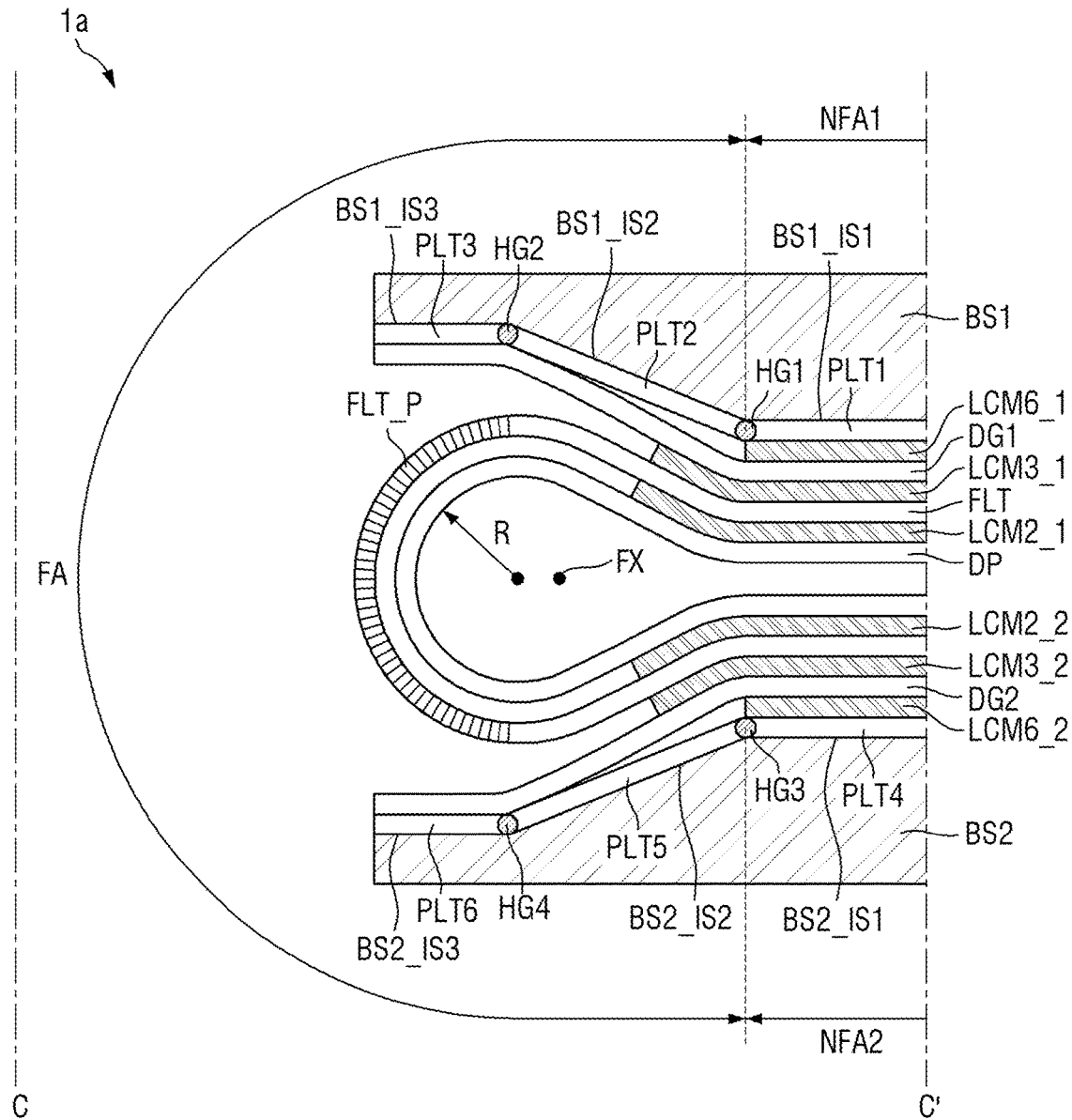

FIGS. 7 and 8 are cross-sectional views of a display device according to another embodiment.

FIGS. 7 and 8 respectively illustrate a cross-section of a display device 1 in a folded state and a cross-section of the display device 1 in an unfolded state, similar to FIGS. 5 and 6.

Referring to FIG. 7, the display device 1 may further include a first base member BS1 and a second base member BS2 disposed on a lower surface of a first plate member WP1 and a lower surface of a second plate member WP2, respectively.

The first base member BS1 may be mainly disposed in a first non-folding area NFA1, and the second base member BS2 may be mainly disposed in a second non-folding area NFA2. A portion of each of the first base member BS1 and the second base member BS2 may be disposed to be placed over a folding area FA. A gap may be formed between the first base member BS1 and the second base member BS2. In the unfolded state, the gap may be disposed to overlap a gap between the first plate member WP1 and the second plate member WP2 in the folding area FA (between a first digitizer layer DG1 and a second digitizer layer DG2) in the thickness direction.

The first base member BS1 and the second base member BS2 may include upper surfaces BS1_IS and BS2_IS, respectively, facing the plate member WP. The upper surface BS1_IS of the first base member BS1 and the upper surface BS2_IS of the second base member BS2 may be inner side surfaces of the first base member BS1 and the second base member BS2, respectively.

The upper surface BS1_IS of the first base member BS1 may include a first flat surface BS1_IS1 disposed on a first plate portion PLT1, a first inclined surface BS1_IS2 disposed on a second plate portion PLT2, and a second flat surface BS1_IS3 disposed on a third plate portion PLT3.

The upper surface BS2_IS of the second base member BS2 may include a third flat surface BS2_IS1 disposed on a fourth plate portion PLT4, a second inclined surface BS2_IS2 disposed on a fifth plate portion PLT5, and a fourth flat surface BS2_IS3 disposed on a sixth plate portion PLT6.

In the unfolded state, the first plate portion PLT1 may be seated on the first flat surface BS1_IS1, and the fourth plate portion PLT4 may be seated on the third flat surface BS2_IS1. In this case, the second plate portion PLT2, the third plate portion PLT3, the fifth plate portion PLT5, and the sixth plate portion PLT6 may be spaced apart from the first base member BS1 and the second base member BS2, but the embodiment is not limited thereto. For example, in the unfolded state, the first plate portion PLT1 and the second plate portion PLT2 may also be spaced apart from the first base member BS1 and the second base member BS2.

One side of the first inclined surface BS1_IS2 is connected to one side of the first flat surface BS1_IS1, and the other side of the first inclined surface BS1_IS2 may be connected to one side of the second flat surface BS1_IS3. One side of the second inclined surface BS2_IS2 is connected to one side of the third flat surface BS2_IS1, and the other side of the second inclined surface BS2_IS2 may be connected to one side of the fourth flat surface BS2_IS3.

Referring to FIG. 7 again, the first inclined surface BS1_IS2 may be inclined such that a thickness of the first base member BS1 decreases from one side of the first inclined surface BS1_IS2 to the other side of the first inclined surface BS1_IS2. The first inclined surface BS1_IS2 may be inclined such that the thickness of the first base member BS1 decreases as it approaches the gap between the first base member BS1 and the second base member BS2.

The second inclined surface BS2_IS2 may be inclined such that a thickness of the second base member BS2 decreases from one side of the second inclined surface BS2_IS2 to the other side of the second inclined surface BS2_IS2. The second inclined surface BS2_IS2 may be inclined such that the thickness of the second base member BS2 decreases as it approaches the gap between the first base member BS1 and the second base member BS2.

A distance between the first flat surface BS1_IS1 (one side of the first inclined surface BS1_IS2) and the first plate portion PLT1 may be less than a distance between the second flat surface BS1_IS3 (the other side of the first inclined surface BS1_IS2) and the third plate portion PLT3.

A distance between the third flat surface BS2_IS1 (one side of the second inclined surface BS2_IS2) and the fourth plate portion PLT4 may be less than a distance between the fourth flat surface BS2_IS3 (the other side of the second inclined surface BS2_IS2) and the sixth plate portion PLT6.

In the unfolded state, the first inclined surface BS1_IS2, the second flat surface BS1_IS3, the fourth flat surface BS2_IS3, and the second inclined surface BS2_IS2 may form a recessed portion recessed downward in a cross-sectional view and a gap may be formed between the second flat surface BS1_IS3 and the fourth flat surface BS2_IS3.

In some implementations, in the unfolded state, the display device 1 may further include one or more coupling members each disposed between the second plate portion PLT2 and the first digitizer layer DG1, between the fifth plate portion PLT5 and the second digitizer layer DG2, and/or between the sixth plate portion PLT6 and the second digitizer layer DG2. The coupling members may be disposed to be separated from each other based on a first hinge portion HG1, a second hinge portion HG2, a third hinge portion HG3, and/or a fourth hinge portion HG4, and may be disposed to be integrally connected to a sixth-first lower coupling member LCM6-1 and a sixth-second lower coupling member LCM6-2.

With further reference to FIG. 8, in the folded state, the second plate portion PLT2 may be seated on the first inclined surface BS1_IS2, the fifth plate portion PLT5 may be seated on the second inclined surface BS2_IS2, the third plate portion PLT3 may be seated on the second flat surface BS1_IS3, and the sixth plate portion PLT6 may be seated on the fourth flat surface BS2_IS3. In this case, the first inclined surface BS1_IS2, the second flat surface BS1_IS3, the second inclined surface BS2_IS2, and the fourth flat surface BS2_IS3 may provide a supporting force capable of bending a portion of each of the first digitizer layer DG1 and the second digitizer layer DG2, which are disposed in the folding area FA, to allow the first digitizer layer DG1 and the second digitizer layer DG2 to be bent in a shape corresponding to the shape of the first inclined surface BS1_IS2, the second flat surface BS1_IS3, the second inclined surface BS2_IS2, and the fourth flat surface BS2_IS3.

Referring to FIGS. 7 and 8, in at least one of the folded state and the unfolded state, one side of the first inclined surface BS1_IS2, the other side of the first inclined surface BS1_IS2, one side of the second inclined surface BS2_IS2, and the other side of the second inclined surface BS2_IS2 may overlap the first hinge portion HG1, the second hinge portion HG2, the third hinge portion HG3, and the fourth hinge portion HG4, respectively, in the thickness direction. In this case, as shown in FIG. 8, in a cross-sectional view, a length of each of the second plate portion PLT2 and the third plate portion PLT3 may be substantially the same as a width of each of the first inclined surface BS1_IS2 and the second flat surface BS1_IS3, respectively, and a length of each of the fifth plate portion PLT5 and the sixth plate portion PLT6 may be substantially the same as a width of each of the second inclined surface BS2_IS2 and the fourth flat surface BS2_IS3.

In FIGS. 7 and 8, the first base member BS1 and the second base member BS2 are illustrated as being cover members covering a lower stack structure, but the embodiment is not limited thereto. For example, the first base member BS1 and the second base member BS2 may include an electronic component such as a cover forming an exterior of the display device 1, a flexible circuit board, a battery, or the like, a frame for mounting the electronic component, and the like in addition to the upper stack structure US, the display panel DP, and the lower stack structure LS shown in FIG. 3.

The embodiment described with reference to FIGS. 7 and 8 is substantially the same as or similar to the embodiment described with reference to FIGS. 1 to 6 except that the first base member BS1 and the second base member BS2 are further included, and thus in the following, redundant descriptions will be omitted for ease in explanation of these figures.

Figure 9:
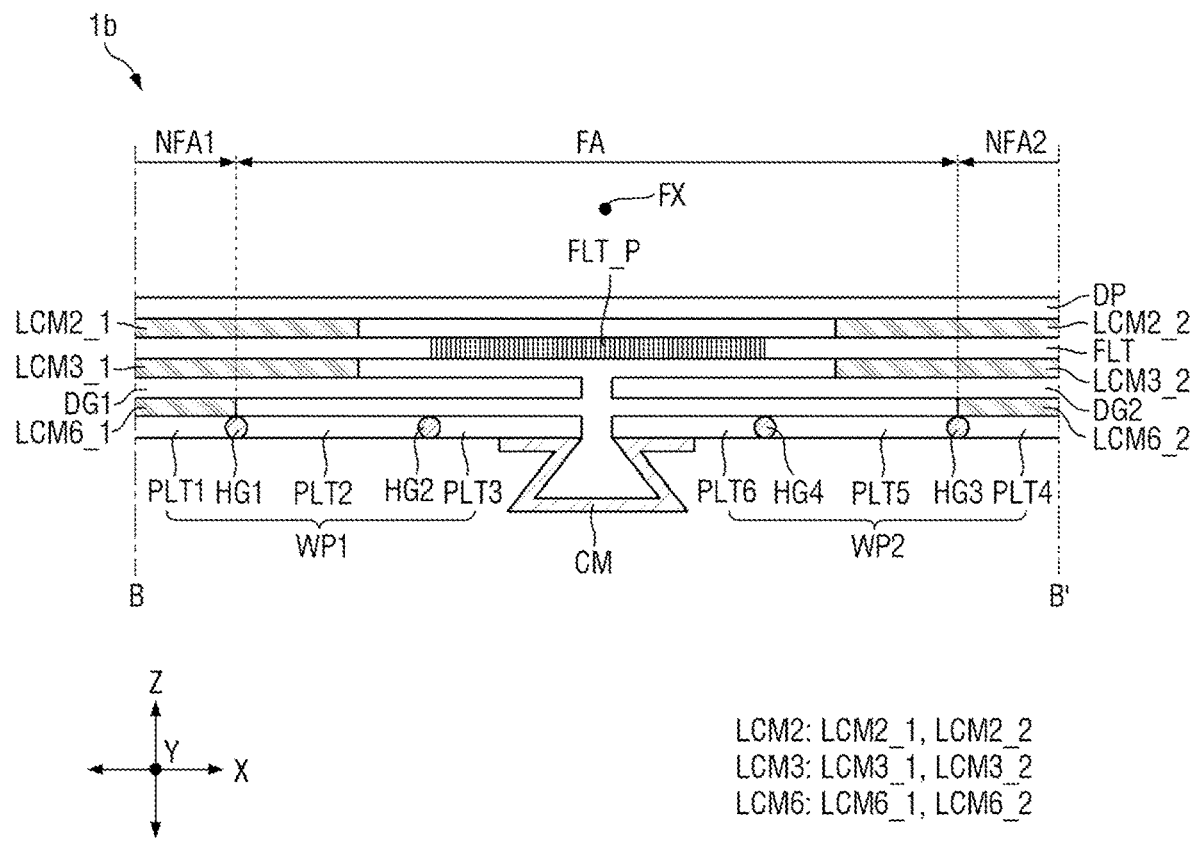
FIGS. 9 and 10 are cross-sectional views of a display device according to still another embodiment.
Figure 10:
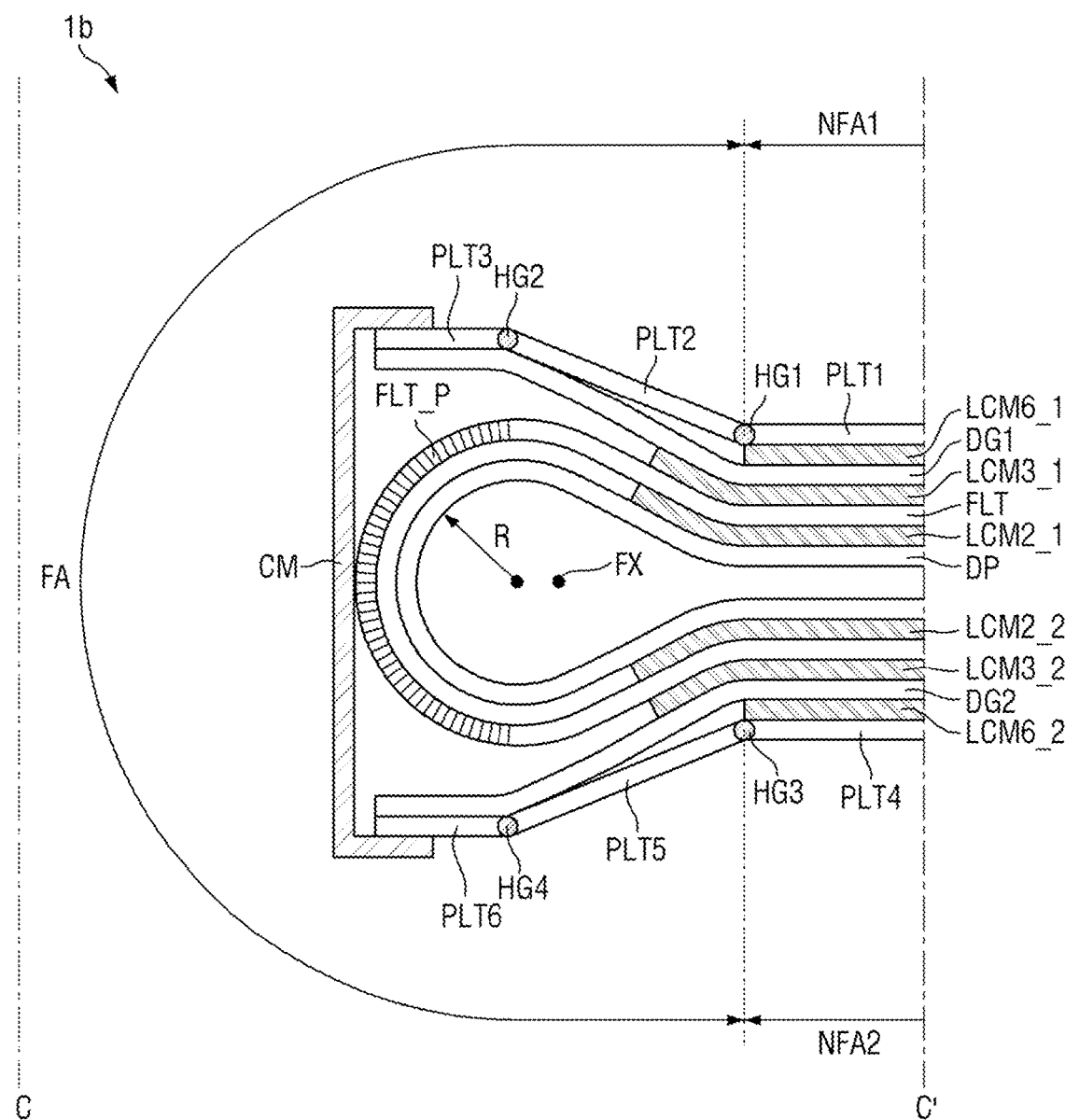

FIGS. 9 and 10 are cross-sectional views of a display device according to still another embodiment.

FIGS. 9 and 10 respectively illustrate a cross-section of a display device 1 in a folded state and a cross-section of the display device 1 in an unfolded state, similar to FIGS. 5 and 6.

Referring to FIGS. 9 and 10, the display device 1 may further include a connection member CM covering a gap between a first plate member WP1 and a second plate member WP2.

The connection member CM may be disposed in a folding area FA. One side of the connection member CM is connected to a third plate portion PLT3, and the other side of the connection member CM may be connected to a sixth plate portion PLT6. One side of the connection member CM may be attached to a lower surface of the third plate portion PLT3, and the other side of the connection member CM may be attached to a lower surface of the sixth plate portion PLT6, but the embodiment is not limited thereto.

For example, the connection member CM may be made of a material such as polyethylene terephthalate (PET) that does not change well in length when the display device 1 is folded and unfolded. In this case, as shown in FIGS. 9 and 10, the connection member CM may be accommodated such that at least a portion thereof is folded or bent in a space provided under the third plate portion PLT3 and the sixth plate portion PLT6 in the unfolded state, and may be flatly deployed to cover a gap between the third plate portion PLT3 and the sixth plate portion PLT6, whose width increases, in the folded state.

In some implementations, the connection member CM may be formed to be stretchable. For example, the connection member CM may be formed of a member including a mesh structure such as a nonwoven fabric, or may be made of a stretchable material such as rubber or polyurethane. In this case, unlike that shown in FIG. 9, the connection member CM may be stretched and compressed to correspond to a width of the gap between the third plate portion PLT3 and the sixth plate portion PLT6, which is varied according to the unfolded state and the folded state, while maintaining a tensioned state.

The embodiment described with reference to FIGS. 9 and 10 is substantially the same as or similar to the embodiment described with reference to FIGS. 1 to 6 except that the connection member CM is further included, and thus in the following, redundant descriptions will be omitted for ease in explanation of these figures.

A display device according to various embodiments can have a minimum separation distance between members separated from each other based on a folding area while having a small thickness.

Effects according to the embodiments are not limited by the content described above, and more various effects are included in the present specification.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel;
a first digitizer layer disposed on the display panel;
a second digitizer layer disposed on the display panel and separated from the first digitizer layer;
a first plate member disposed on the first digitizer layer; and
a second plate member disposed on the second digitizer layer,
wherein each of the first plate member and the second plate member includes a plurality of plate portions and one or more hinge portions configured to rotatably connect the plurality of plate portions to each other, wherein the first plate member includes a first plate portion, a second plate portion having one end rotatably connected to one end of the first plate portion, and a third plate portion having one end rotatably connected to another end of the second plate portion, and wherein the second plate member includes a fourth plate portion, a fifth plate portion having one end rotatably connected to one end of the fourth plate portion, and a sixth plate portion having one end rotatably connected to another end of the fifth plate portion.

2. The display device of claim 1, wherein, when the display device is folded, at least one plate portion of the plurality of plate portions rotates in a direction different from a direction in which the remaining plate portions other than the at least one plate portion of the plurality of plate portions rotate.

3. The display device of claim 1, wherein,
a portion of the display panel is bent to have a curvature when the display device is folded, and
at least a portion of the bent portion of the display panel is disposed between the second plate portion and the fifth plate portion and between the third plate portion and the sixth plate portion.

4. The display device of claim 1, wherein, when the display device is folded, a distance between the one end of the first plate portion and the one end of the fourth plate portion is less than a distance between another end of the third plate portion and another end of the sixth plate portion.

5. The display device of claim 1, wherein
a gap is formed between the first digitizer layer and the second digitizer layer when the display device is unfolded, and
when the display device is folded, the third plate portion and the sixth plate portion rotate in a direction in which the gap is narrowed.

6. The display device of claim 5, wherein, when the display device is folded, a portion of the first digitizer layer disposed on the third plate portion and a portion of the second digitizer layer disposed on the sixth plate portion are bent respectively due to the third plate portion and the sixth plate portion.

7. The display device of claim 1, further comprising a first hinge portion configured to rotatably connect the one end of the first plate portion and the one end of the second plate portion, a second hinge portion configured to rotatably connect the another end of the second plate portion and the one end of the third plate portion, a third hinge portion configured to rotatably connect the one end of the fourth plate portion and the one end of the fifth plate portion, and a fourth hinge portion configured to rotatably connect the another end of the fifth plate portion and the one end of the sixth plate portion.

8. The display device of claim 7, further comprising a planarization member disposed on the first digitizer layer and the second digitizer layer and including a pattern portion configured to reduce rigidity of the display device,
wherein the second hinge portion and the fourth hinge portion are disposed to be aligned with boundaries of the pattern portion in a thickness direction of the display device.

9. The display device of claim 8, further comprising a first digitizer layer coupling member interposed between the planarization member and the first digitizer layer and a second digitizer layer coupling member interposed between the planarization member and the second digitizer layer.

10. The display device of claim 7, further comprising a first plate member coupling member interposed between the first digitizer layer and the first plate member and a second plate member coupling member interposed between the second digitizer layer and the second plate member.

11. The display device of claim 7, wherein
a distance between the first hinge portion and the third hinge portion is greater than a distance between the second hinge portion and the fourth hinge portion when the display device is unfolded, and
the distance between the first hinge portion and the third hinge portion is less than the distance between the second hinge portion and the fourth hinge portion when the display device is folded.

12. The display device of claim 1, further comprising a first base member disposed on the first plate member and a second base member disposed on the second plate member,
wherein each of the first base member and the second base member includes an inclined surface on which the plate portion is seated when the display device is folded.

13. The display device of claim 1, further comprising a connection member connecting an end portion of the first plate member and an end portion of the second plate member to cover a gap between the first plate member and the second plate member.

14. A display device comprising:
an integral member disposed in a folding area, a first non-folding area connected to one side of the folding area, and a second non-folding area connected to another side of the folding area;
a first separable member disposed on the integral member and located in the first non-folding area;
a second separable member disposed on the integral member, located in the second non-folding area, and separated from the first separable member;
a first plate member disposed on the first separable member; and
a second plate member disposed on the second separable member,
wherein each of the first plate member and the second plate member includes a plurality of plate portions and one or more hinge portions configured to rotatably connect the plurality of plate portions to each other,
wherein the first plate member includes a first plate portion, a second plate portion having one end rotatably connected to one end of the first plate portion; and a third plate portion having one end rotatably connected to another end of the second plate portion, and
wherein the second plate member includes a fourth plate portion, a fifth plate portion having one end rotatably connected to one end of the fourth plate portion, and a sixth plate portion having one end rotatably connected to another end of the fifth plate portion.

15. The display device of claim 14, wherein
the integral member includes a display panel,
the first separable member includes a first digitizer layer, and
the second separable member includes a second digitizer layer.

16. The display device of claim 15, the separable member includes a first plate member coupling member interposed between the first digitizer layer and the first plate member and a second plate member coupling member interposed between the second digitizer layer and the second plate member.

17. The display device of claim 15, wherein
the integral member includes a planarization member disposed between the display panel and the separable member, and the separable member includes a first digitizer layer coupling member interposed between the planarization member and the first digitizer layer, and a second digitizer layer coupling member interposed between the planarization member and the second digitizer layer.

18. A display device having a folding area, a first non-folding area disposed on one side of the folding area, and a second non-folding area disposed on another side of the folding area, the display device comprising:
- a display panel disposed in the first non-folding area, the folding area, and the second non-folding area;
- a first plate member disposed in the first non-folding area; and
- a second plate member disposed in the second non-folding area,
- wherein each of the first plate member and the second plate member includes a plurality of plate portions and a plurality of hinge portions disposed between the plurality of plate portions,
- wherein, when the display device is folded, at least one plate portion of the plurality of plate portions rotates in a direction different from a direction in which the remaining plate portions other than the at least one plate portion of the plurality of plate portions rotate.

* * * * *